(12) United States Patent
Steinbach et al.

(10) Patent No.: US 6,397,730 B1
(45) Date of Patent: Jun. 4, 2002

(54) SANDWICH AND METHOD FOR THE PRODUCTION THEREOF

(76) Inventors: Ortwin Steinbach; Marion Ferstl, both of Schulgasse 2, Ravensburg D-88214 (DE)

( * ) Notice: Subject to any disclaimer, the term of this patent is extended or adjusted under 35 U.S.C. 154(b) by 0 days.

(21) Appl. No.: 09/856,124

(22) PCT Filed: Nov. 16, 1999

(86) PCT No.: PCT/DE99/03641
§ 371 (c)(1),
(2), (4) Date: Aug. 15, 2001

(87) PCT Pub. No.: WO00/28829
PCT Pub. Date: May 25, 2000

(30) Foreign Application Priority Data

Nov. 18, 1998 (DE) .......................... 198 53 032
Sep. 10, 1999 (DE) .......................... 199 43 506

(51) Int. Cl.⁷ .................. A47J 37/00; A47J 37/06; H05B 3/20; H05B 3/68; A21D 13/00
(52) U.S. Cl. .................. 99/331; 99/349; 99/353; 99/372; 99/376; 99/378; 99/379; 99/383; 99/389; 99/400; 99/446; 219/521; 219/525
(58) Field of Search .................. 99/444–446, 331, 99/349, 341, 353, 372–379, 380–384, 422, 425, 401, 426, 400; 219/521, 524, 525, 386, 472, 553

(56) References Cited

U.S. PATENT DOCUMENTS 5,129,313 A * 7/1992 Coppier .................. 99/376
5,138,938 A * 8/1992 McClean .................. 99/331

FOREIGN PATENT DOCUMENTS

| | | |
|---|---|---|
| BE | 836 132 | 3/1976 |
| DE | 21 54 000 | 5/1972 |
| DE | 23 53 905 | 7/1975 |
| DE | 28 35 700 | 2/1980 |
| DE | 297 08 417 | 9/1997 |
| FR | 1 534 325 | 7/1968 |
| FR | 2 407 698 | 6/1979 |
| FR | 2 521 419 | 8/1983 |
| GB | 1 440 266 | 6/1976 |
| GB | 1 510 996 | 5/1978 |
| GB | 2 300 104 | 10/1996 |
| WO | WO 89/11800 | 12/1989 |
| WO | WO 94/09644 | 5/1994 |

* cited by examiner

Primary Examiner—Timothy F. Simone
(74) Attorney, Agent, or Firm—Crowell & Moring LLP

(57) ABSTRACT

The invention relates to a sandwich consisting of two toasted slices of bread and an edible filling placed between said slices. According to the invention, the filling is essentially arranged in the inner region of the surfaces of the slices of bread and the slices of bread are pressed together in a peripheral edge area with greater force than in the inner region so that the slices of bread adhere to each other and form a cohesive sandwich arrangement, whereby the filling is packed between the slices of bread. The invention also relates to a method for the production of a toasted sandwich that consists of two slices of bread and an edible filling placed between said slices. According to the invention, the filling is initially and essentially arranged in the inner region of the surface of a first underlying slice of bread. A second slice of bread is subsequently placed thereon. The sandwich arrangement is pressed together in an edge area with greater force than in the inner region under the effect of heating, whereby the slices of bread and the filling placed therebetween form a cohesive sandwich arrangement whose peripheral edge areas are closed. The invention further relates to a device for the production of an inventive sandwich.

20 Claims, 4 Drawing Sheets

SANDWICH AND METHOD FOR THE PRODUCTION THEREOF

PRIOR ART

Figure 1:
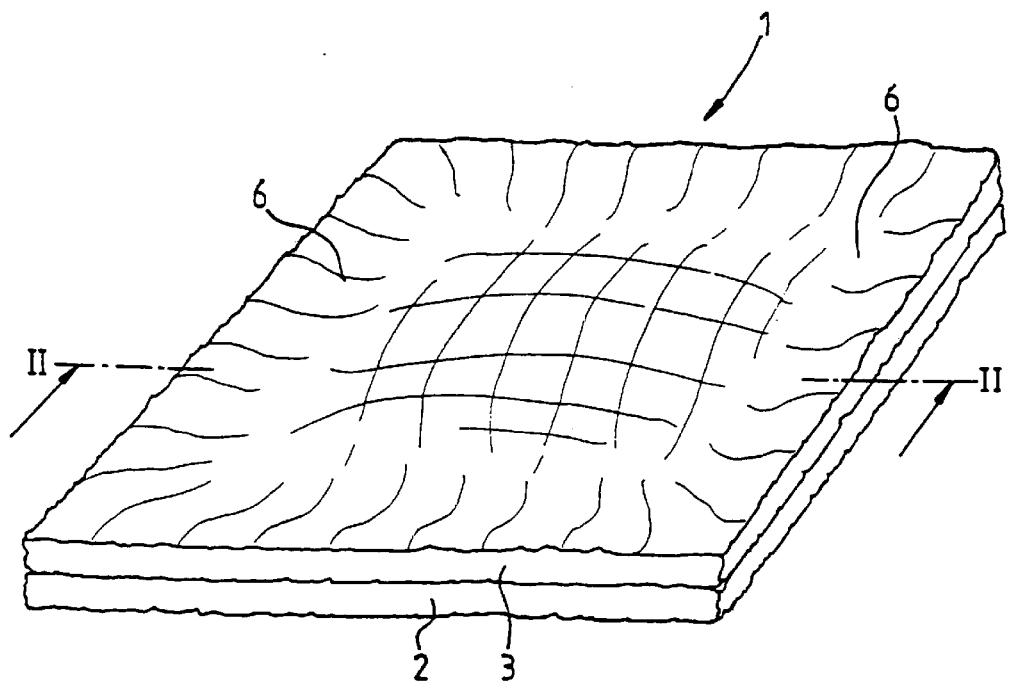

Sandwiches and methods for producing them have been disclosed in diverse embodiments. In what is referred to as a toasted sandwich maker, prepared toasting-bread sandwiches, in which a filling layer made, for example, of ham, cheese, tomatoes or pineapple, is usually found between the toasting bread, are placed between two pairs of pans of the toasted sandwich maker, which are arranged essentially parallel to one another and resemble waffle irons, and are toasted under pressure and heat.

This enables a filled sandwich with toasted bread slices to be produced in one operation. However, in the case of filling layers of relatively large volume it is frequently the case that some of the filling layer is pressed out at the edge of the toasting-bread slices as they are being pressed together. This is not a disadvantage if such toasted sandwiches are provided on a plate for immediate consumption. A filling layer which bulges out of the side of the sandwich is therefore not really a problem. Neither is the fact that in spite of the pressing-together process the toasted sandwich opens again relatively easily.

However, as soon as relatively large piece numbers of such sandwiches are produced and are provided, for example, in a cold state, for later consumption, it is particularly undesirable for some of the filling layer to cover the outside of the sandwich and possibly soften it, or for the sandwich to fall apart if it is transported, for example, not only in the flat state.

The international patent application WO 94/09644 describes a sandwich and a method for producing it in which two bread slices and a sandwich filling layer are connected by means of an edible glue. In addition, this arrangement can be compressed using roller elements so that the filling layer is pressed into the bread slices. Although this results in a sandwich which holds together securely, the production process is complicated because of the application of glue. Moreover, as before some of the filling layer can reach the outside and can possibly soften the outside of the sandwich or make a plate or a serviette necessary for its consumption.

OBJECT AND ADVANTAGES OF THE INVENTION

The invention is based on the object of providing a toasted sandwich in which the filling layer is essentially unable to reach the outside and the sandwich can be prevented from falling apart, for example when transported in different positions.

Advantageous and expedient developments of the invention are specified in the subclaims.

The invention proceeds initially from a sandwich which consists of two toasted bread slices and an edible filling layer present between the bread slices. The central idea of the invention resides in the fact that the filling layer is arranged essentially in the inner region of the bread-slice surface, and that the bread slices are pressed together more strongly, under the action of heat, in the peripheral edge region than in the inner region, so that they stick to each other without the use of, for example "edible glue", and form a sandwich arrangement which holds together and in which the filling layer is encapsulated between the bread slices. This has the effect that neither during the production of the sandwich, nor after its completion can some of the filling layer reach the outside and possibly soften the toasted bread surface. The sandwich therefore always appears attractive. Moreover, a person can do without auxiliary means, such as cutlery or serviettes, for the consumption of the sandwich, since the sandwich, with its toasted, dry surface, can be picked up and eaten.

In order to be able to accommodate filling layers of relatively large volume between the toasting-bread slices, it is further proposed that the bread slices are only pressed together in the edge region.

In addition, it is particularly advantageous if the filling layer is ready-cooked. This provides a sandwich which is ready for immediate consumption.

In order to achieve a particularly compact construction of the sandwich, it is moreover proposed that the filling layer is a mixture which can be molded in the raw state. When initially compressed under heat, this mixture then fills the gap between the bread slices in the best possible manner and, moreover, ensures that they hold together well.

In the case of a method according to the invention for producing a toasted sandwich which consists of two bread slices, preferably toasting-bread slices and in which an edible filling layer is present between the bread slices, the basis of the invention resides in the fact that first of all the filling layer is applied essentially in the inner region of the surface of a first bread slice lying at the bottom, that subsequently a second bread slice is arranged thereon, and that then, under the action of heat, this sandwich arrangement is pressed together more strongly in the edge region than in its inner region, so that the bread slices together with the filling layer lying in between form a unit which holds together and whose peripheral edge regions are closed. That is to say, the filling layer is encapsulated between the bread slices. It is first of all achieved by the manner of production according to the invention that relatively large amounts of the filling layer are not pressed out laterally in an undesirable manner during production of the sandwich. Moreover, the relatively strong pressing-together in the edge region means that the bread slices hold together extremely well. The invention makes use in an elegant manner of the finding that because of the amount of starch in the bread a type of bonding of two bread slices without "glue" can be achieved just by pressure and heat. A sandwich can therefore be produced which can be transported, in a simple manner in different positions, without falling apart. Moreover, the sandwich can, as already described above, be picked up and eaten as a snack, since it is completely dry on the toasted outside.

In order to use filling layers which are particularly highly stacked, or filling layers which give off juice in an undesirable manner when pressed together, and in order to prevent a filling layer from being compressed too strongly outwards, it is furthermore proposed that essentially only the edge regions of the sandwich arrangement are pressed together.

It is particularly preferred if a moldable mixture is used as the filling layer. This mixture can be applied in a simple manner in the inner region of the bread-slice surface. The moldable mixture can be applied raw. In this case, it is preferred if the heat and the pressure are apportioned during the pressing-together and toasting in such a manner that after this process the raw mixture has cooked. This enables, for example, even a moldable, initially raw meat mixture to be used directly in a sandwich. Of course, fillings with vegetables or portions of egg can also be used as the raw mixture.

An appliance according to the invention for toasting sandwiches comprises two heatable pan elements which can move with respect to each other. The essential idea in this appliance resides in the fact that the pan elements are designed in such a manner that bread slices which are inserted between the pan elements, lie one above the other and have a filling layer which is arranged in between and is situated essentially in the inner region of the bread-slice surface can be pressed together under pressure and heat, when the pan elements are brought together, significantly more strongly in a peripheral, flat edge region than in the remaining sections, so that by the pressed-together, peripheral edge region the bread slices form with the filling layer a unit which holds together.

A preferred pan element which has these properties has flat supporting means for a substantial part of a peripheral edge region of a bread slice, in which case the pan region which is framed by the supporting means lies at a lower level with regard to the supporting surface of the supporting means. This enables the inner region of the bread slice to yield during the pressing-together process. In addition to an in any case stronger pressing action on the peripheral edge region of the bread slices, the degree of the pressing action against the bread-slice regions lying on the inside is set depending on how far the framed pan region is offset with respect to the supporting means.

In a particularly preferred refinement of the invention, the two pan elements are in each case provided with flat supporting means, in which case the supporting means are positioned on the pan elements in such a manner that they essentially lie one above the other in the brought-together state of the pan elements. This ensures a strong pressing action on the peripheral edge region of the bread slices.

In order to obtain an attractive visual effect of the pressed-together bread slices and, moreover, to obtain a crisp bread surface, it is furthermore proposed that the pan region which is framed by the supporting means is provided with a surface structure, for example is corrugated or fluted in a groove-like manner.

In a particularly advantageous refinement of the invention, the pan elements are designed in such a manner that when a bread slice is placed onto the supporting means the region which is framed by the supporting means is still connected to the outside. This measure has the effect that the moisture which is given off by the bread slices when the bread slices are pressed together under the action of heat can flow off to the outside. To a certain extent, there should be an exchange of air between the regions of a bread slice which are resting on the pan element and the surroundings. This finding is used to afford the advantage of the toasted surface of the bread slices being particularly crisp and remaining crisp even when stored for a prolonged period. This is due to the fact that this process causes the surface to undergo caramelization (process by heating starch and/or sugar in the bread) and, as a result, the surface pores are closed. On account of the sealed, moisture-repelling surface, the connection of the two bread layers in the edge region also remains stable.

In a further advantageous refinement of the invention, the supporting means and/or the sections of the pan element in the vicinity of the supporting means are provided with apertures in order to obtain a connection to the outside of the region framed by the supporting means. If the pan region framed by the supporting means is fluted in a groove-like manner, the connection of this region to the outside can be achieved, for example, by the groove-like flutes simply being continued to the outside under the supporting means.

In order to obtain uniform toasting and, if appropriate, pressing of that region of the bread slices which lies on the inside, it is also proposed that the region which is framed by the supporting means is essentially planar despite a surface structure.

The supporting means preferably form a continuously running frame with a flat supporting surface.

In order to obtain adequate sticking of the bread slices to each other, it is furthermore proposed that the supporting width of the peripheral supporting means is at least 4 mm. In a further preferred refinement of the invention, the supporting surface of the supporting means can be provided with a surface structure. This surface structure is advantageously matched to a surface structure of opposite supporting means on the other pan element.

In order to obtain a pressing action on the peripheral edge of the bread slices which is as uniform as possible, in another advantageous refinement of the invention it is preferred if the pan elements are guided such that they can move with respect to each other in such a manner that they are aligned essentially parallel to each other in the brought-together state. For example, the pan elements are connected via a folding hinge which has an option for setting the distance between the pan elements coupled to it for the purpose of adaptation to different sandwich thicknesses.

DRAWINGS

Figure 3:
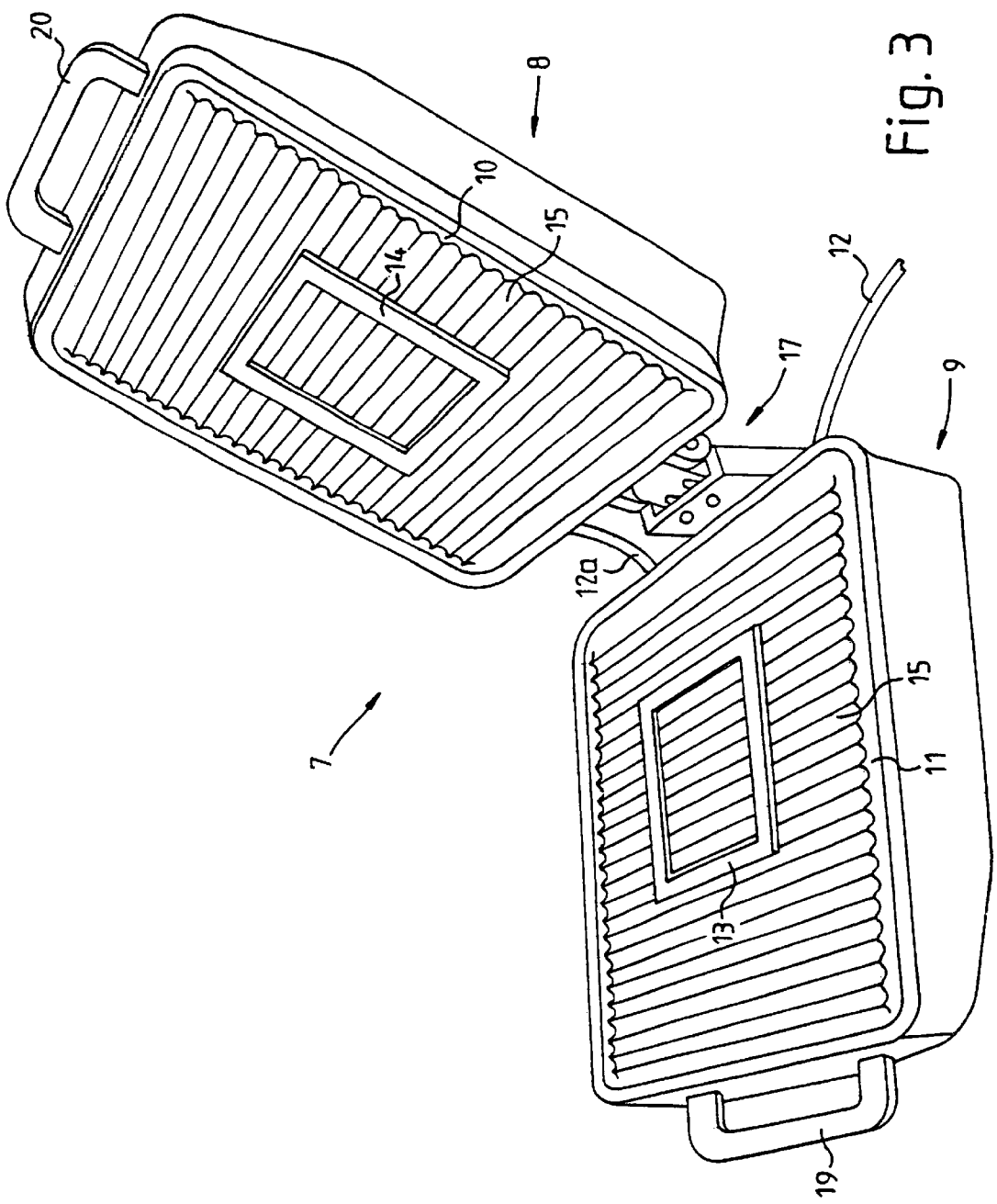
Figure 4:
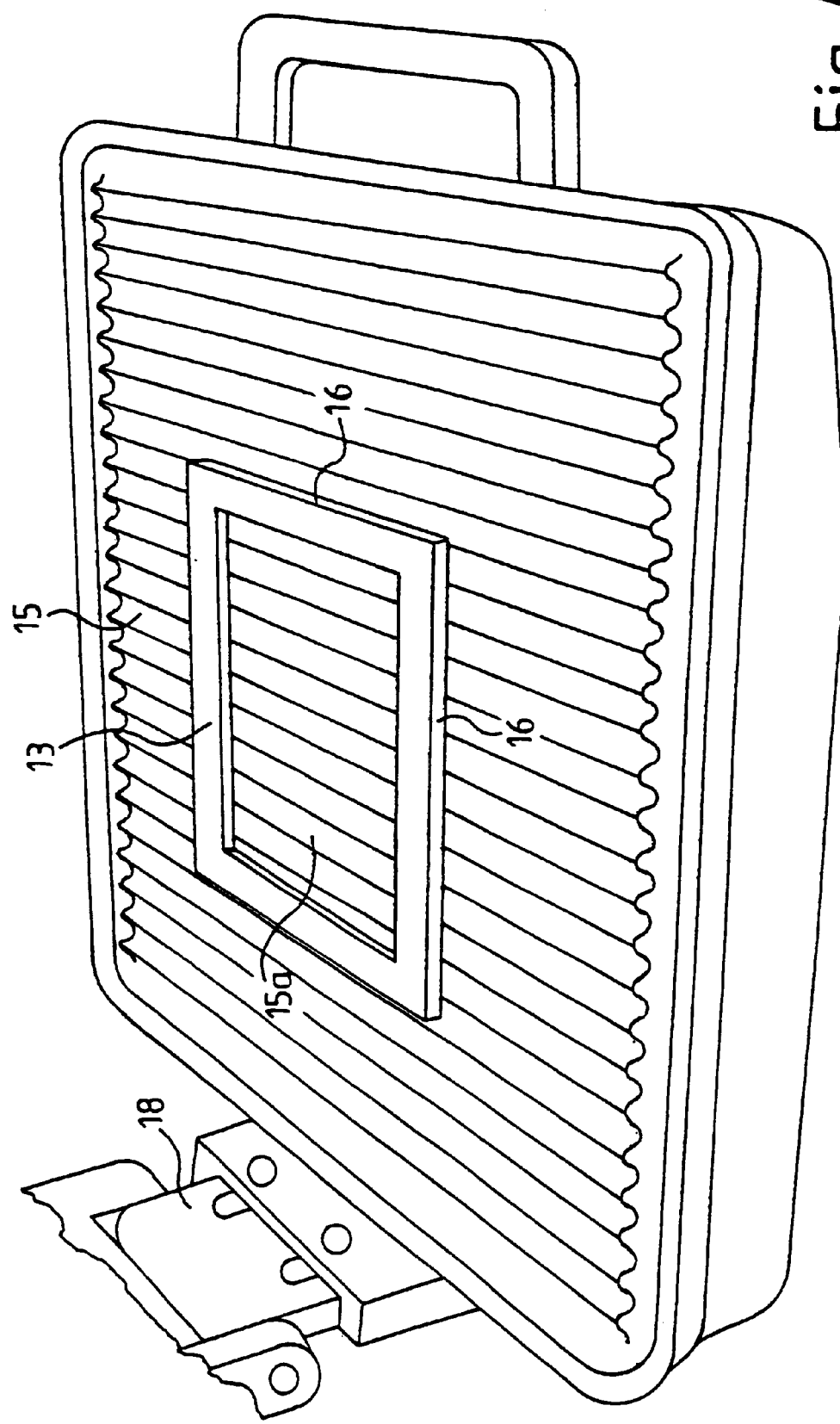
Figure 5:
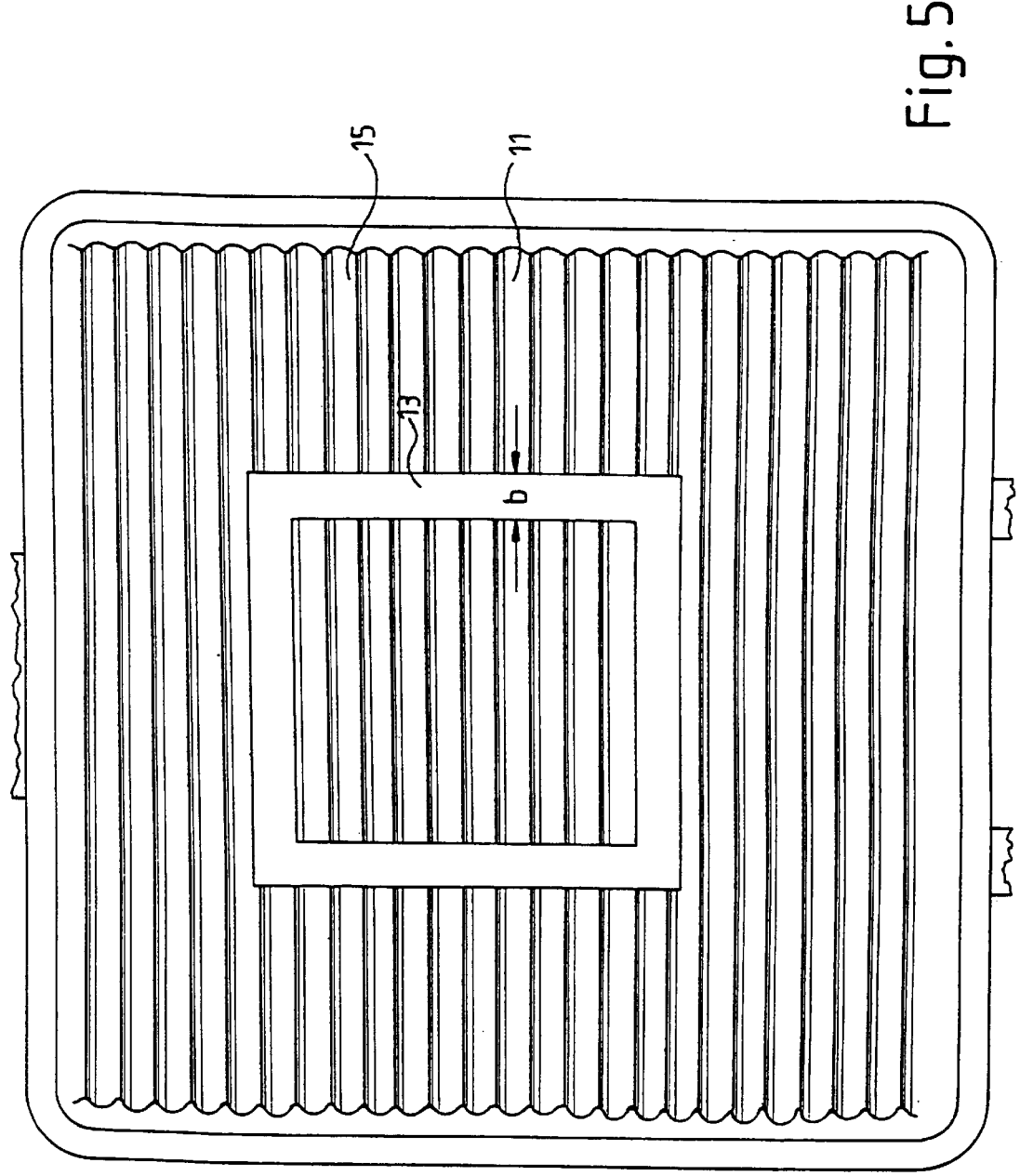

An exemplary embodiment of the invention is illustrated in the drawings and is explained in greater detail in the following description with further advantages and details being indicated. In the drawings FIG. 1 shows a sandwich according to the invention in a perspective view, FIG. 2 shows a sectional view of the sandwich according to FIG. 1 along the line of intersection II—II, FIG. 3 shows a perspective view of an appliance for toasting sandwiches with two housing parts which can be folded with respect to each other, FIG. 4 shows an enlarged, perspective view of a housing part with a pan element of the appliance according to FIG. 3, and FIG. 5 shows the perspectively illustrated pan element according to FIG. 4 in a plan view.

DESCRIPTION OF THE EXEMPLARY EMBODIMENT

Figure 2:
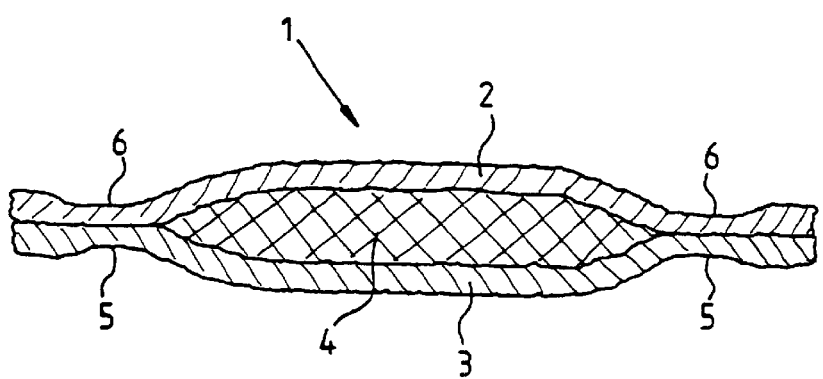

The sandwich 1 according to the invention of FIGS. 1 and 2 consists of two toasting-bread slices 2, 3 which, by way of example, completely enclose a meat filling 4. The two toasting-bread slices 2, 3 are in each case pressed together at the outer edge 5, 6 under the action of heat, so that the toasting-bread slices 2, 3 stick readily to each other and it is ensured that the meat filling 4 does not reach the outside.

In order to produce the sandwich 1, a raw meat mixture is applied onto the toasting-bread slice 3, in the region of the toasting-bread slice surface which lies on the inside. The toasting-bread slice 2 is then arranged in a covering manner on top of it. This sandwich arrangement is then pressed together under heat and pressure so that firstly the outsides of the toasting-bread slices are toasted, the meat mixture 4 placed in it is cooked and, in addition, the toasting-bread slices 2, 3 are pressed together predominantly in each case in their edge regions 5,6. Although the thickness of the bread slices is thereby significantly reduced in these regions, the bread slices also stick well to each other as a result, since the bonding action under heat of the constituents contained in the bread is used.

The final product is a toasted sandwich which is provided with a filling or filling layer (a meat filling 4 is only specified here by way of example) and which is preferably consumed in the cold state, for example as a type of "snack on the run".

FIGS. 3 to 5 illustrate a sandwich toaster 7 for producing a sandwich 1 according to the invention. The sandwich toaster 7 comprises two housing parts 8, 9 which are fitted such that they can move with respect to each other. A pan element 10, 11 is arranged on the inside of each housing part 8, 9. The pan elements 10, 11 consist, for example, of cast iron and can be heated from the rear side via heating elements, which cannot be seen, similarly to a waffle iron. The heating takes place electrically via a power supply cable 12 and a connecting cable 12a between the housing parts. The pan elements 10, 11 have a fluting running in parallel and composed of groove-like depressions 15. A respective supporting frame 13, 14 is arranged in a fixed manner on the pan elements 10, 11. The supporting frames 13, 14 are positioned in such a manner that they lie one above the other in the folded-together state of the pan elements 10, 11. The external dimensions of the frame elements preferably corresponds [sic] to the external dimensions of bread slices which are to be pressed together; in the present case, by way of example, toasting-bread slices. That is to say, the supporting frames 13, 14 are square. The width b of the supporting frames is, for example, 10 mm, but should not be smaller than 4 mm, in order to be able to ensure sufficient connection between the toasting-bread slices.

It can be seen in FIG. 4 that the "fluting" 15 continues below the supporting frames 13, 14. A region 15a of the respective pan element, which region is framed by the supporting frames 13, 14, is thereby connected as before to regions lying on the outside, even with a toasting-bread slice placed onto said region 15a (not illustrated). In this manner, during the pressing process moisture released from the bread slices under the action of heat can immediately flow away, as a result of which the surface of the pressed-together bread slices is particularly crisp and remains crisp even after storage for a prolonged period, for example in a refrigerator. Moreover, a particularly good connection of the pressed-together edge regions of the bread slices is obtained by this means. This effect could also be referred to as a "biscuit effect".

In order to produce a sandwich 1 according to the invention, a first toasting-bread slice is placed, for example, onto the supporting frame 13 in such a manner that its edges each end at the outer edge 16 of the supporting frame 13. A filling layer is then placed on the toasting-bread slice, in the inner region of the toasting-bread slice surface. A second toasting-bread slice is subsequently placed over it aligned in a fitting manner.

The sandwich toaster 7, which is adequately preheated, is then closed, as a result of which, in particular, the peripheral edge regions of the toasting-bread slices are pressed together under pressure and heat and become intimately connected. Those regions of the toasting-bread slices which lie on the inside are only slightly compressed, but obtain a visually attractive, toasted and fluted surface. In this process, moisture emerging from the sandwich arrangement can flow off to the outside.

The folding hinge 14, to which the housing parts 8, 9 with the pan elements 10, 11 is [sic] linked to each other, can be adjusted via a height-adjustable leg 18 in such a manner that when the sandwich toaster 7 is closed the supporting frames 13, 14 can always be aligned essentially parallel to each other, irrespective of the thickness of the toasting-bread slices. A handle 19, 20 is respectively arranged on the housing parts 8, 9 to carry out the folding procedure.

A plurality of frame elements for different sizes and shapes of bread slices may also be positioned on the pan elements, or the pan elements 10, 11 and/or the supporting frames 13, 14 are designed as interchangeable components which can easily be exchanged.

The surface structure of the pan elements can also be realized in diverse ways, for example also with a cross corrugation or the like.

Furthermore, the frame elements can be designed in such a manner that bread slices lying one above the other are divided, for example, into two or more regions with a peripheral, pressed-together edge region in which different fillings are placed.

We claim:

1. Appliance for toasting sandwiches, comprising:

two heatable pan elements which can move with respect to each other, where at least one pan element has a flat support for a substantial part of a peripheral edge region of a bread slice, and wherein a pan region which is framed by the flat support lies at a lower level with regard to a supporting surface of the flat support such that bread slices, which are inserted between the pan elements to lie one above the other with a filling layer arranged in between, are pressable together under pressure and heat when the pan elements are brought together significantly more strongly in a peripheral, flat edge region than in the remaining sections such that the bread slices are connected to the filling layer by the pressed-together and peripheral edge region to form a unit which holds together, and wherein the pan elements are designed such that when the bread slices are placed onto the flat support the pan region which is framed by the flat support is still connected to the outside along opposite edge regions when the pressing-together process takes place to allow moisture given-off by the bread slices to flow-off to the outside.

2. Appliance according to claim 1, wherein the connection of the pan region which is framed by the flat support is formed along opposite edge regions.

3. Appliance according to claim 1, wherein both pan elements are similarly designed, in which the flat supports are positioned on the pan elements so as to essentially lie one above the other in the brought-together state of the pan elements.

4. Appliance according to claim 2, wherein both pan elements are similarly designed, in which the flat supports are positioned on the pan elements so as to essentially lie one above the other in the brought-together state of the pan elements.

5. Appliance according to claim 1, wherein that region of the pan elements which is framed by the flat support is provided with a surface structure.

6. Appliance according to claim 2, wherein that region of the pan elements which is framed by the flat support is provided with a surface structure.

7. Appliance according to claim 3, wherein that region of the pan elements which is framed by the flat support is provided with a surface structure.

8. Appliance according to claim 1, wherein the frame-shaped flat supports and/or the sections of the pan element in the vicinity of the flat supports have apertures from the framed region to the outside.

9. Appliance according to claim 2, wherein the frame-shaped flat supports and/or the sections of the pan element in the vicinity of the flat supports have apertures from the framed region to the outside.

10. Appliance according to claim 3, wherein the frame-shaped flat supports and/or the sections of the pan element in the vicinity of the flat supports have apertures from the framed region to the outside.

11. Appliance according to claim 5, wherein the frame-shaped flat supports and/or the sections of the pan element in the vicinity of the flat supports have apertures from the framed region to the outside.

12. Appliance according to claim 1, wherein the region which is framed by the flat support is essentially planar despite a surface structure.

13. Appliance according to claim 1, wherein the flat support forms a continuously running frame with a flat supporting surface.

14. Appliance according to claim 2, wherein the flat support forms a continuously running frame with a flat supporting surface.

15. Appliance according to claim 3, wherein the flat support forms a continuously running frame with a flat supporting surface.

16. Appliance according to claim 5, wherein the flat support forms a continuously running frame with a flat supporting surface.

17. Appliance according to claim 1, wherein a supporting width (b) along a periphery of the flat support is at least 4 mm.

18. Appliance according to claim 2, wherein a supporting width (b) along a periphery of the flat support is at least 4 mm.

19. Appliance according to claim 3, wherein a supporting width (b) along a periphery of the flat support is at least 4 mm.

20. Appliance according to claim 1, wherein the pan elements are guided such that they are movable with respect to each other so as to be alignable essentially parallel to each other in the brought-together state.

* * * * *